E. O'CONNOR.
SPRING TREAD FOR WHEELS.
APPLICATION FILED JAN. 10, 1918.
1,286,729.
Patented Dec. 3, 1918.
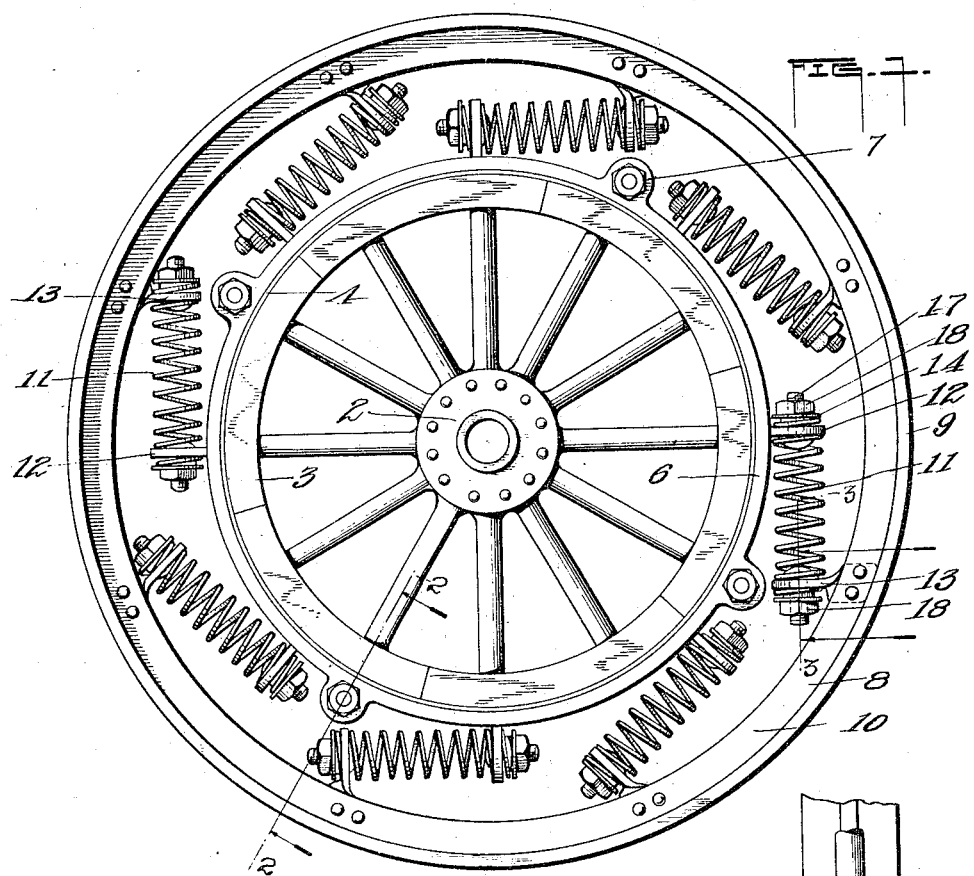
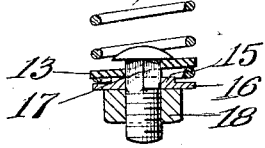
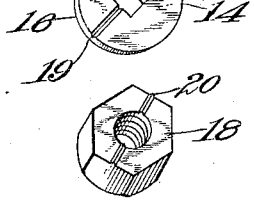
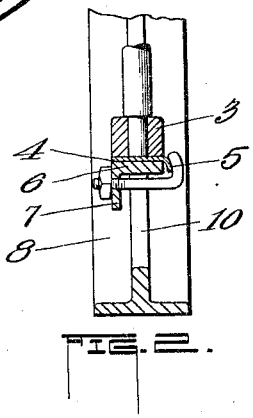
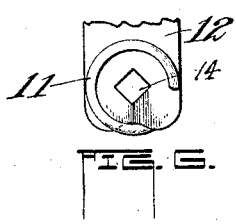
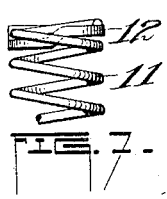
INVENTOR.
Edward O'Connor
By W. K. Tifft
ATT'Y

UNITED STATES PATENT OFFICE.

EDWARD O'CONNOR, OF PEORIA, ILLINOIS.

SPRING-TREAD FOR WHEELS.

1,286,729.   Specification of Letters Patent.   Patented Dec. 3, 1918.

Application filed January 10, 1918. Serial No. 211,305.

*To all whom it may concern:*

Be it known that I, EDWARD O'CONNOR, a citizen of the United States, residing at Peoria, in the county of Peoria and State of Illinois, have invented certain new and useful Improvements in Spring-Treads for Wheels, of which the following is a specification.

This invention relates to spring tires for wheels adaptable to motor and other vehicles upon which resilient tires are now used.

An object of this invention is to provide a spring tire having its several parts so arranged and constructed as to take the place of pneumatic tires, avoiding thereby the care and expense in the upkeep of the same, and at the same time maintaining the same running ease and comparative lightness in the weight of the wheel that would attend the use of a pneumatic tire.

Another object of this invention is to provide a spring tire which will in its application to the rim of a wheel occupy about the usual and normal space of a pneumatic tire, thereby maintaining the normal proportion and size of such wheel.

A further object of this invention is to provide a spring tire made up of concentrically arranged members, the inner of which shall comprise a ring member provided with perforated brackets spaced thereabout and a tread member spaced therefrom, and to the outer surface of which may be applied, if desired, a supplemental tread surface, as for instance a facing of hard rubber or the like, resilient or spring members in co-relation with said concentrically arranged ring and rim members designed to be interposed in a relation to maintain a proper normal spacing of said ring and rim members, and also so arranged as to take the axially tending strains incident to use of such wheel on lines tangential to the circumference of said wheel and in such a relation distributively throughout the series of springs employed that approximately one-half of said springs will be compressed while the other half are being expanded.

Another object of my invention is to so arrange the spring members relatively and to relate them to the ring and tread members that the ring member may within certain confined limits approach or recede from the rim member and also the rim may move, within a limited degree circumferentially about the ring member.

Another object of my invention is to so arrange the springs with respect to the spaced ring and rim members that under all strains upon the individual springs in all instances and emergency of use incident to compression or expansion, it will be impossible that limits of capability of extension or compression of such spring units shall be reached; also relating the springs to the concentric ring and rim members in a manner that all lateral strains shall be distributed throughout the entire length of each spring and render it impossible to put the tension upon any single part or confined portion thereof.

Another object of my invention is to relate the spring members to the concentric ring and rim members in a manner to prevent axial turning of said springs.

My invention further consists in the relative arrangement of a ring member and a tread member in normal concentric relation; in the provision of a plurality of spring members interposed between said ring and rim members arranged in spaced relation and relatively to distribute strains or pressure incident to use of the wheel to each and every individual spring and proportionately as near as possible to bear such strain, one-half by compression and the other half by extension of said spring members.

My invention further includes the provision of specially formed brackets upon the ring and rim members respectively of the tread spaced at intervals thereabout and arranged relatively—those on the wheel ring member and those on the tread member in alternating order; of means for supporting and securing the springs to the bracket members respectively on the ring and rim members of the complete tread in a relation to permit longitudinal extension or retraction of said spring members between said supports, but at the same time preventing the axial turning thereof; a specially formed washer and a bolt and nut for securing the washer to the bracket members and means for locking the nuts in conjunction therewith under the yielding tension of the spring members.

My invention also includes means for detachably connecting the tread members to the rim of a wheel.

I am aware that heretofore resilient means have been employed intermediate the hub and the rim members of a wheel to minimize jars and the like incident to use of such wheels upon motor driven vehicles and the like. I am also aware that heretofore resilient tread members have been employed in connection with the ordinary spoked wheels, but in all the instances to which my attention has been called such tread members were built directly upon or attached directly to, or the resilient members associated with such tread members were attached directly to the said rims. In my present invention I have developed a spring tire that is wholly self contained and completely independent of the wheel to which it is to be applied and in practice is adapted to be applied in the same manner as is the ordinary demountable rim to the ordinary vehicle wheel adapted to receive it. In this respect I am assuming that I have made an advance upon this particular art.

I am also aware that resilient coil and accordion springs have heretofore been employed in connection with tread members adapted to be applied to a vehicle wheel. Therefore I do not claim broadly the application of the coil spring in the connection here noted.

Having in mind the disadvantages and imperfections of earlier disclosures both by public exemplification and by that of prior patents which have failed when applied for practical use of have proven to have been too expensive in applying or duration of capable service limited because of their getting out of order or the parts being lost, I have directed my efforts to such a relative arrangement of such spring members both with respect to the ring and tread members and to each other and to a means of attaching and supporting the springs that efficiency is assured, permanence of attachment effected, and durability of the spring members guaranteed.

Referring to the drawings, Figure 1 is an elevation showing my improved spring tire applied to a wheel. Fig. 2 is a section on the line 2—2 of Fig. 1, showing parts that facilitate attachment of the spring tire to a wheel. Fig. 3 is a section on the line 3—3 of Fig. 1, showing details of supporting means for the ends of the springs and means of attaching said springs and supporting means to lugs respectively on the ring and tread members of the spring tire. Fig. 4 is a detail view showing a groove in a washer member. Fig. 5 is a detail view of a nut showing a rib thereon. Fig. 6 is a detail bottom plan view of one of the lugs, showing the adjacent end of the spring interlocking therewith, and Fig. 7 is a detail outer side view of the spring and the lug interlocked therewith.

Referring to the drawings, 2 refers generally to the hub of the wheel, the same being provided with the usual spokes and with a felly as 3, fixed upon said spokes; 4 is a supplemental part of the felly 3 and may consist of a metal covering for the outer face of the said felly, the same being provided with an outwardly bearing flanged part 5 integral therewith.

Referring now particularly to my improved spring tire member, 6 is a ring which is adapted in practice to be of such shape and size as to fit closely upon the covering member 4 of the felly of the wheel (see the relation shown in Fig. 2), said ring being provided with a plurality of perforated brackets as 7, spaced at intervals about said ring. 8 refers generally to a ring or tread member which may be formed in band shape as at 9 and provided with a right angularly disposed flange 10 located about midway of the width of said tread. This tread in practice may, if desired, be covered with hard rubber (not shown) or the like.

For the purpose of spacing the ring and tread members apart and for the purpose of maintaining the normal and workable relation under all conditions of use, I have provided spring members 11. These spring members are each connected at their respective ends one with the ring member 6 and the other with the tread member 8. To facilitate the attachment of the spring members as above noted and for maintaining them in the proper relation to the members with which they attach, I have provided brackets as 12 on the ring member 6 and bracket members as 13 on the tread member arranged substantially in the relation shown in Fig. 1 of the drawings. The springs 11 are arranged with relation to opposed brackets as for instance brackets referred to in the drawings as 12 and 13 (detail reference to manner of connecting springs to brackets instanced only in connection with one spring and set of brackets) that is in relation of abutment therebetween and with the ends of the springs passing about and beyond said brackets; the brackets being shaped in relatively offset sides and provided with a way or depression of the brake in the offset so that the spring will properly abut and pass thereabout. In attaching or securing the spring to the brackets I provide a washer 16 which is cut away to form the shouldered part 15 (see Fig. 3) which provides a seat for the ends of the spring thereupon. In securing the spring, the washer and the brackets together I provide a bolt 17 preferably having a squared portion in cross section which engages similar shaped openings 14 in the brackets and the washers. I also provide a nut as 18 which is provided with a rib 20 thereon. Applying the nut 18 when screwed upon the bolt and brought in contact with washer 16, it serves to hold the bracket and the washer together under the tension of spring 11. The rib 20 on 18 is adapted to engage groove 19 in the washer to lock the parts together.

In the use of my improved spring tire, it will be borne in mind that the size of said tires may be varied to suit wheels of different measurements. Similarly, the normal and necessary weight or proportion of parts utilized in construction of my spring tread may be changed to meet the emergency of use, for example in connection with a comparatively light vehicle or with a heavy truck.

Considering the matter of use of my improved spring tire will say that I am able to meet the emergency on kind and character of use, that is: I arrange the springs substantially in the relation shown in the drawings, and as such number of springs that the angular relative relation of said operation will be maintained; also I arranged the springs in a manner as heretofore explained, that the shock or jar or in fact normally applied pressure and use shall be distributed to each and every spring in the series in gradually decreasing expansion and compression force from the point of meeting the ground or obstacle to a point exactly opposite such contact: also I arranged the springs so that about half of the force from shock shall be met by compression of spring members and the other half by expansion thereof.

The number, arrangement and manner of support and reinforcement of the spring members is such that the utmost of the probable lateral strain force will be readily resistant without damage to the spring tire member; also because of such manner of support as hereinbefore noted as the ends of the spring members, all lateral strains thereon are distributed throughout substantially the entire length of the spring instead of being applied to a single point or to limited area of said spring, thereby insuring durability; also the division of stresses practically evenly between compression and expansion also serve to lengthen the life of the spring and finally the connecting and attachment of the springs in a relation to the ring and tread members, that at no time is it possible to apply the utmost limit of compression or expansion, that this also serves to extend the life of the spring almost indefinitely.

I have shown herein my preferred construction and application of the principles and parts involved in my invention and while the success of my improved spring tire depends very largely upon the arrangement of parts and construction shown, nevertheless, there are reasonable limits within which changes may be made and to such changes and modifications within such reasonable limits, it is my desire that the claims of my invention shall apply as well as to the exact and detailed structure herein disclosed.

What I claim is:—

1. In a spring tire, the combination of inner and outer spaced ring members each provided with bracket members thereon having perforations therethrough and ways in their edge portions, spring members spaced between said bracket members and extending through said ways beyond the bracket members, washer members provided with perforations therethrough and disposed against the spring members, bolts passing through the bracket, spring and washer members, and nuts upon the bolts for binding the washer and bracket members together under the tension of the interposed portions of the spring members.

2. In a spring tire, in combination, inner and outer spaced ring members each provided with substantially uniformly spaced bracket members thereabout extending toward the opposing ring members and arranged relatively, those upon the inner and outer ring members at about substantially intermediate points between such opposed bracket members, said bracket members being provided each with a perforation and formed to provide a way to permit the end of spring members abutting against the same to be passed to a point in the rear of said bracket members, a plurality of spring members engaging opposed bracket members respectively upon the inner and outer rings and abutting thereagainst, and means for securing the spring members at opposite ends to adjacent bracket members.

3. In a spring tire, in combination, inner and outer spaced ring members each provided with bracket members having perforations therethrough, spring members engaging opposed bracket members respectively on the inner and outer ring members, by abutting against the same and with the ends of said spring members passing therebeyond, perforated washer members, engageable by the ends of the spring members and also with a groove in one face thereof, a bolt passing through the perforations in the lug and washer members and a nut provided with a rib portion adapted to secure the washer members and the bracket members together under the tension of the springs and for locking said nut upon the washer member through the engagement of the ribbed portion thereon with the grooved portion of the washer.

In testimony whereof I affix my signature in presence of two witnesses.

EDWARD O'CONNOR.

Witnesses:
  THOMAS L. O'HERN,
  EVA MCCREADY.

Copies of this patent may be obtained for five cents each, by addressing the "Commissioner of Patents, Washington, D. C."